(12) United States Patent
Fujimoto

(10) Patent No.: US 9,069,403 B2
(45) Date of Patent: Jun. 30, 2015

(54) DISPLAY OPERATING DEVICE OPERATING DISPLAY OF 3D OBJECT, AND IMAGE FORMING APPARATUS WITH DISPLAY OPERATING DEVICE

(71) Applicant: KYOCERA Document Solutions Inc., Osaka (JP)

(72) Inventor: Norie Fujimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/341,655

(22) Filed: Jul. 25, 2014

(65) Prior Publication Data

US 2015/0029553 A1 Jan. 29, 2015

(30) Foreign Application Priority Data

Jul. 29, 2013 (JP) ................................ 2013-156413

(51) Int. Cl.
G06F 3/12 (2006.01)
G06F 3/041 (2006.01)
G06T 3/60 (2006.01)
H04N 1/00 (2006.01)

(52) U.S. Cl.
CPC ............ *G06F 3/0412* (2013.01); *G06F 3/0416* (2013.01); *G06T 3/60* (2013.01); *H04N 1/00411* (2013.01); *G06T 2200/04* (2013.01); *H04N 2201/0094* (2013.01)

(58) Field of Classification Search
USPC .................................................. 358/1.1–3.29
See application file for complete search history.

(56) References Cited

U.S. PATENT DOCUMENTS

2011/0041098 A1* 2/2011 Kajiya et al. .................. 715/849

FOREIGN PATENT DOCUMENTS

JP 2007-087324 A 4/2007

* cited by examiner

*Primary Examiner* — Marcellus Augustin
(74) *Attorney, Agent, or Firm* — Knobble, Martens, Olson & Bear LLP

(57) ABSTRACT

A display operating device includes a position detecting section, an axis decision section, a movement determining section, a display section, and a first rotation processing section. The position detecting section is configured to detect three positions on a touch surface. The axis decision section is configured to decide a first axis using first and second positions which are two of the three positions. The movement determining section is configured to determine whether or not a third position, which is the remaining one of the three positions, is moving. The first rotation processing section is configured to, when with the 3D object displayed on the display section the three positions are detected and the third position is determined to be moving, rotate the 3D object by a first predetermined angle about the first axis.

6 Claims, 15 Drawing Sheets

DISPLAY OPERATING DEVICE OPERATING DISPLAY OF 3D OBJECT, AND IMAGE FORMING APPARATUS WITH DISPLAY OPERATING DEVICE

INCORPORATION BY REFERENCE

This application claims priority to Japanese Patent Application No. 2013-156413 filed on Jul. 29, 2013, the entire contents of which are incorporated by reference herein.

BACKGROUND

The present disclosure relates to a display operating device configured to operate the display of a 3D object and an image forming apparatus with the display operating device.

An object displayed in three dimensions is called a 3D object. It is convenient if the 3D object can be displayed in a way that allows the user to rotate it in any direction.

In order to rotate the 3D object in an arbitrary direction, the user needs to designate the direction and angle of rotation of the 3D object.

One method for designating the direction and angle of rotation is a GUI (graphical user interface). With the use of the GUI, both of a button for designating the direction of rotation and a button for designating the angle of rotation need to be displayed, which narrows the display area for the 3D object.

Another method for designating the direction and angle of rotation is a touch gesture. However, if a one-finger or two-finger touch gesture is used as an operation for rotating the 3D object in any direction, the operation may conflict with another touch operation. Specifically, an operation using a one-finger touch gesture may conflict with, for example, a drag (move) operation. An operation using a two-finger touch gesture may conflict with, for example, a pinch (enlarge/reduce) operation.

Some techniques are proposed which enable an operation for rotating a 3D object in any direction using a one-finger touch gesture without conflicting with other operations. For example, a touch panel device in which a first designating region capable of instructing an operation for rotating an object displayed, a second designating region capable of instructing an operation for translating the object, and a third designating region capable of instructing an operation for enlarging or reducing the object are previously set on a touch panel is known. This touch panel device is configured so that when the user first touches the first designating region and, with its touch operation kept effective, successively moves a touch position, the object can be displayed with the rotation according to the direction and amount of the movement of the touch position.

SUMMARY

A technique improved over the aforementioned techniques is proposed as one aspect of the present disclosure.

A display operating device according to one aspect of the present disclosure includes a position detecting section, an axis decision section, a movement determining section, a display section, and a first rotation processing section.

The position detecting section includes a touch surface and is configured to detect three positions on the touch surface which the fingertips of three fingers are touching.

The axis decision section is configured to, using first and second positions, which are two of the three positions detected by the position detecting section, decide a first axis which is parallel in an imaginary three-dimensional space to a first imaginary line passing through the first and second positions and passes through a predetermined position of a 3D object located in the imaginary three-dimensional space.

The movement determining section is configured to determine whether or not a third position, which is the remaining one of the three positions, is moving.

The first rotation processing section is configured to, when with the 3D object displayed on the display section the position detecting section detects the three positions and the movement determining section determines that the third position is moving, perform processing to rotate the 3D object displayed on the display section by a first predetermined angle about the first axis decided by the axis decision section.

An image forming apparatus according to another aspect of the present disclosure includes an image forming section and the aforementioned display operating device.

DETAILED DESCRIPTION

Hereinafter, one embodiment of the present disclosure will be described with reference to the drawings.

First, a description will be given of the structure of a display operating device according to the embodiment of the present disclosure.

Figure 1:
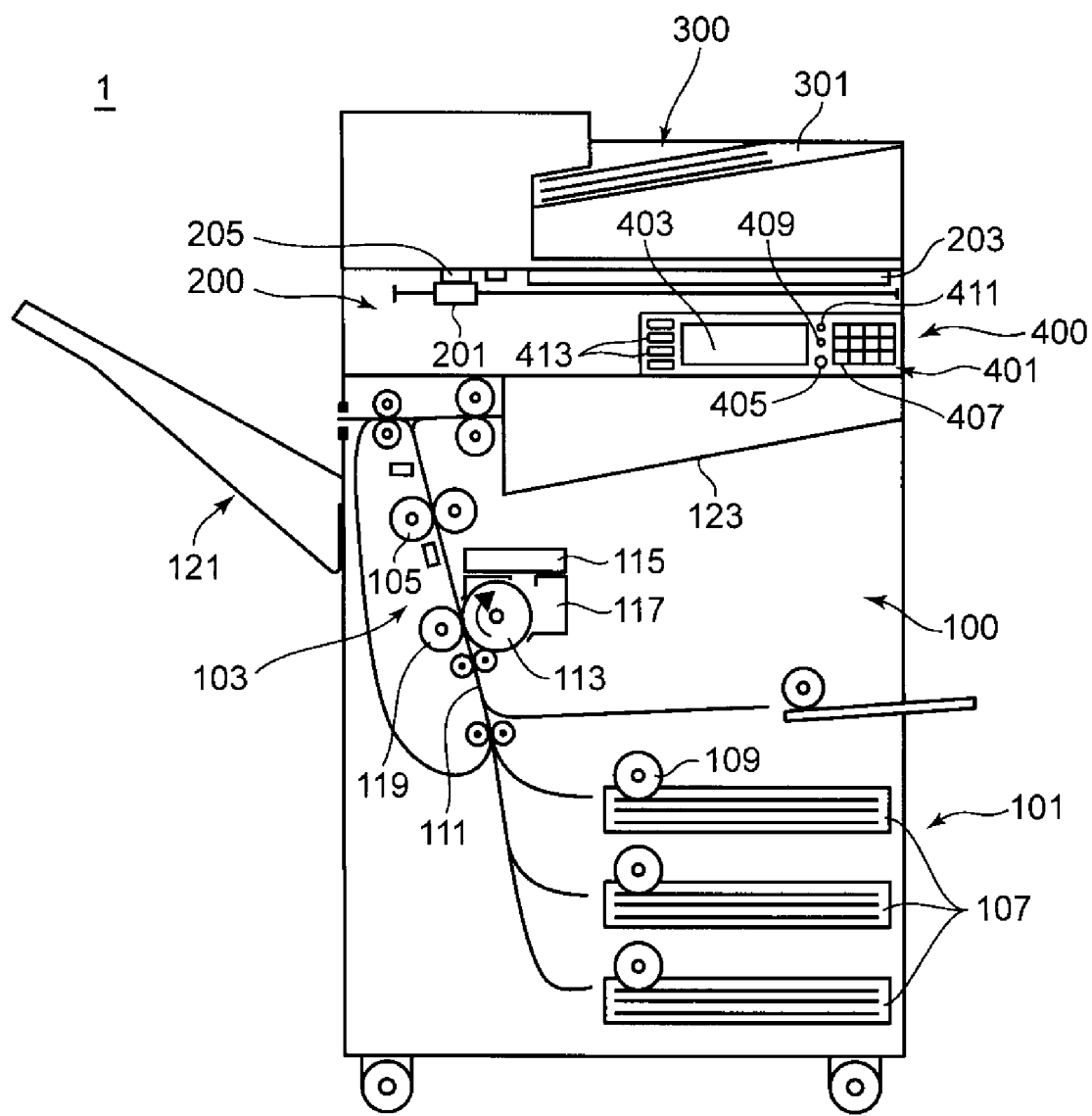
FIG. 1 is a view for illustrating a schematic internal structure of an image forming apparatus with a display operating device according to one embodiment of the present disclosure.

FIG. 1 is a view for illustrating a schematic internal structure of an image forming apparatus 1 with a display operating device according to the embodiment of the present disclosure.

As shown in FIG. 1, the image forming apparatus 1 is applicable to a digital multifunction peripheral having multiple functions including, for example, copy, print, scan, and facsimile. The image forming apparatus 1 includes an apparatus body 100, a document reading section 200 disposed on the top of the apparatus body 100, a document feed section 300 disposed on the top of the document reading section 200, and an operating section 400 disposed at the front of an upper portion of the apparatus body 100.

The document feed section 300 functions as an automatic document feeder and can feed a plurality of original documents placed on a document placement section 301 so that the original documents can be continuously read by the document reading section 200.

The document reading section 200 includes a carriage 201 on which an exposure lamp and so on are mounted, an original glass plate 203 made of a transparent material, such as glass, an unshown CCD (charge coupled device) sensor, and a document read slit 205. In reading an original document placed on the original glass plate 203, the original document is read by the CCD sensor while the carriage 201 is being moved in the longitudinal direction of the original glass plate 203. On the other hand, in reading an original document fed from the document feed section 300, the carriage 201 is moved to a position facing the document read slit 205 and in this state the original document fed from the document feed section 300 is read through the document read slit 205 by the CCD sensor. The CCD sensor outputs data read from the original document as image data.

The apparatus body 100 includes a sheet storage section 101, an image forming section 103, and a fixing section 105. The sheet storage section 101 is disposed in a lowermost portion of the apparatus body 100 and includes a plurality of sheet trays 107 each capable of storing a stack of paper sheets. The uppermost paper sheet of the stack of paper sheets stored in each sheet tray 107 is fed toward a sheet conveyance path 111 by the driving of a pick-up roller 109. The paper sheet passes through the sheet conveyance path 111 and is conveyed to the image forming section 103.

The image forming section 103 is configured to form a toner image on the paper sheet conveyed thereto. The image forming section 103 includes a photosensitive drum 113, an exposure section 115, a developing section 117, and a transfer section 119. The exposure section 115 is configured to generate light modulated according to image data (such as image data output from the document reading section 200, image data sent from personal computers or image data received by facsimile) and apply the light to a uniformly charged peripheral surface of the photosensitive drum 113. Thus, an electrostatic latent image corresponding to the image data is formed on the peripheral surface of the photosensitive drum 113. When in this state toner is supplied from the developing section 117 to the peripheral surface of the photosensitive drum 113, a toner image corresponding to the image data is formed on the peripheral surface. This toner image is transferred, by the transfer section 119, to the paper sheet fed from the sheet storage section 101 described previously.

The paper sheet having the toner image transferred thereto is conveyed to the fixing section 105. In the fixing section 105, heat and pressure are applied to the toner image and the paper sheet, so that the toner image is fixed on the paper sheet. The paper sheet is discharged to a stacking tray 121 or an output tray 123.

The operating section 400 includes an operating key section 401 and a touch panel display 403. The touch panel display 403 has a touch panel function and can display a screen containing software keys and so on. The user can operate software keys and so on while looking at the screen, thus doing necessary setting and so on for executing a desired function, such as copy.

The operating key section 401 is provided with operating keys formed of hardware keys. Specifically, the operating key section 401 is provided with a start key 405, a ten-key pad 407, a stop key 409, a reset key 411, function selection keys 413 for switching among copy, print, scan, and facsimile, and other keys.

The start key 405 is a key for starting an operation, such as copying, facsimile transmission, and so on. The ten-key pad 407 is a set of keys through which numerical values, such as a number of copies or a facsimile number, can be input. The stop key 409 is a key for stopping an operation, such as a copy operation, in the middle. The reset key 411 is a key for returning the setting to a default setting.

The function selection keys 413 include a copy key, a send key, and other keys and are keys for switching among a copy function, a transmission function, and other functions. When the user operates the copy key, an initial screen for copying is displayed on the touch panel display 403. When the user operates the send key, an initial screen for facsimile transmission and mail delivery is displayed on the touch panel display 403.

Figure 2:
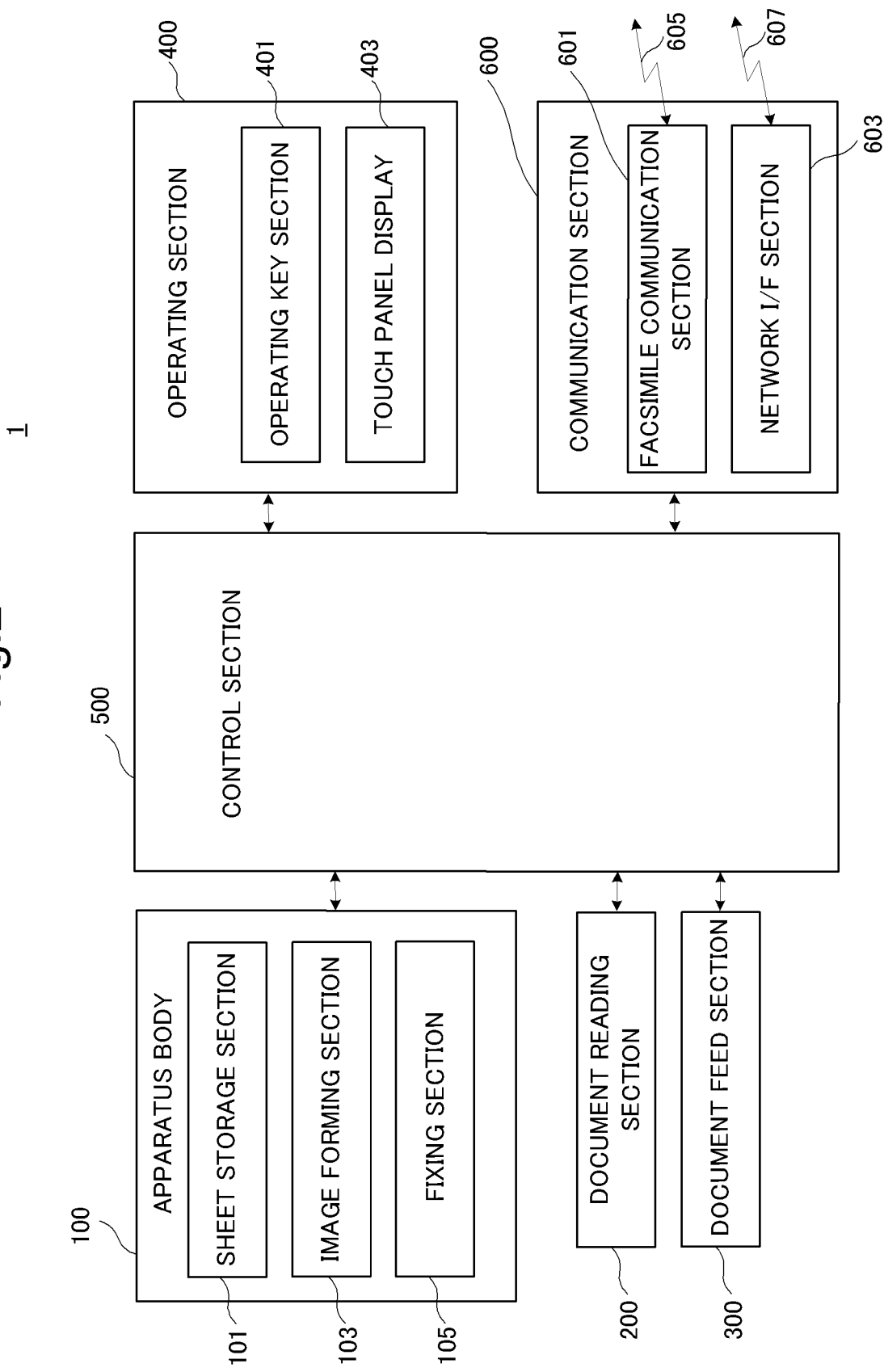
FIG. 2 is a block diagram showing the architecture of the image forming apparatus shown in FIG. 1.

FIG. 2 is a block diagram showing the architecture of the image forming apparatus 1 shown in FIG. 1.

As shown in FIG. 2, the image forming apparatus 1 has a structure in which the apparatus body 100, the document reading section 200, the document feed section 300, the operating section 400, the control section 500, and a communication section 600 are connected to each other via a bus. Since the apparatus body 100, the document reading section 200, the document feed section 300, and the operating section 400 have already been described, a description thereof will not be repeated here.

The control section 500 includes a CPU (central processing unit), a ROM (read only memory), a RAM (random access memory), an image memory, and so on. The CPU has necessary control for operating the image forming apparatus 1 over the aforementioned components of the image forming apparatus 1, such as the apparatus body 100. The ROM stores software necessary for controlling the operation of the image forming apparatus 1. The RAM is used for, for example, temporary storage of data generated during execution of the software and storage of applications software. The image memory is used for temporary storage of image data (such as image data output from the document reading section 200, image data sent from personal computers or image data received by facsimile).

The communication section 600 includes a facsimile communication section 601 and a network I/F section 603. The facsimile communication section 601 includes an NCU (network control unit) operable to control the connection with a destination facsimile via a telephone network and a modem circuit operable to modulate and demodulate signals for facsimile communication. The facsimile communication section 601 can be connected to a telephone network 605.

The network I/F section 603 can be connected to a LAN (local area network) 607. The network I/F section 603 is a communication interface circuit for performing communication with terminal devices connected to the LAN 607, such as personal computers.

Figure 3:
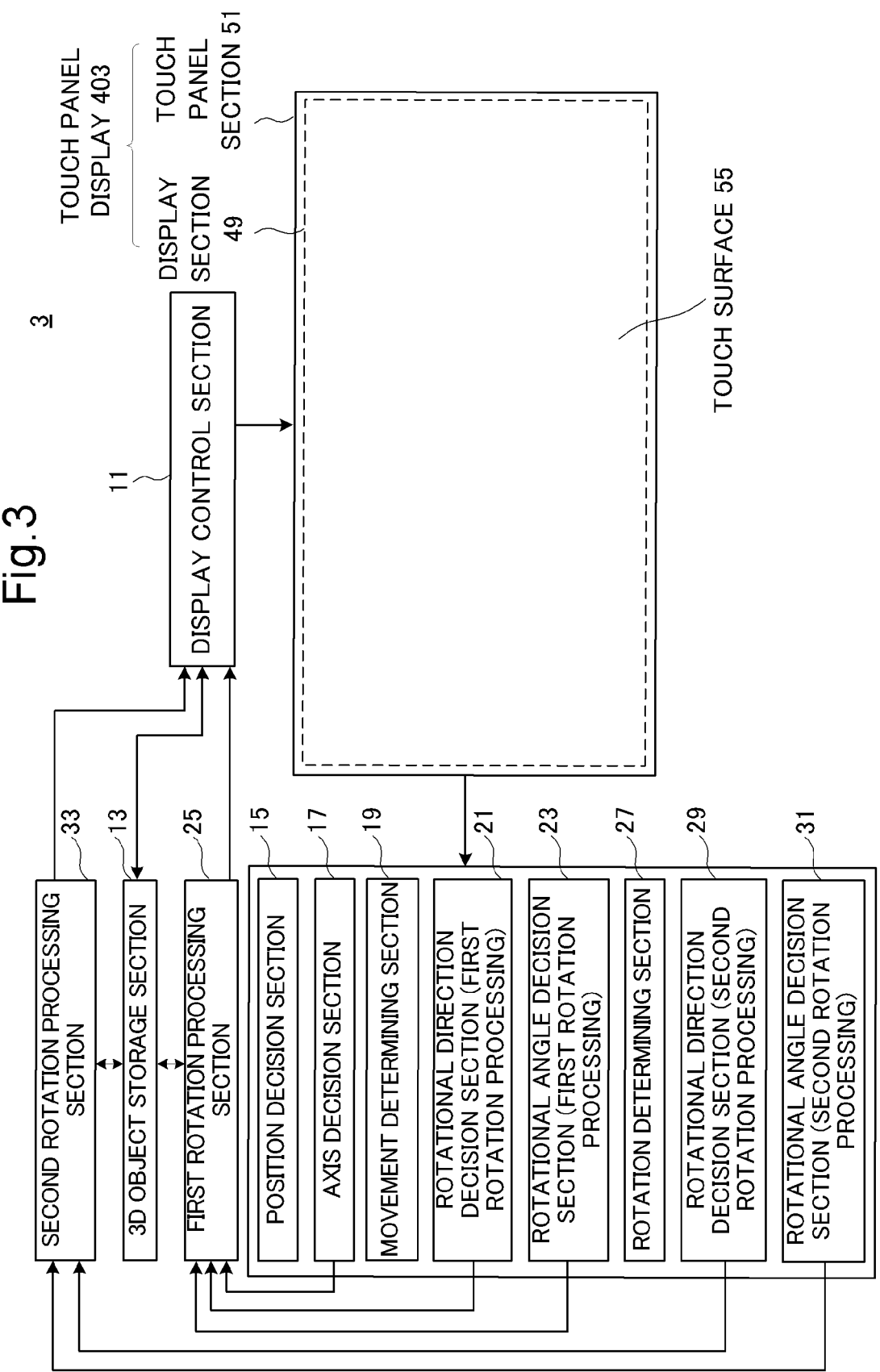
FIG. 3 is a block diagram showing the architecture of the display operating device shown in FIG. 1.

FIG. 3 is a block diagram showing the architecture of the display operating device 3 according to the embodiment of the present disclosure.

As shown in FIG. 3, the display operating device 3 includes the aforementioned touch panel display 403, a display control section 11, a 3D object storage section 13, a position decision section 15, an axis decision section 17, a movement determining section 19, a rotational direction decision section 21, a rotational angle decision section 23, a first rotation processing section 25, a rotation determining section 27, a rotational direction decision section 29, a rotational angle decision section 31, and a second rotation processing section 33. The touch panel display 403 is shown in plan view.

The touch panel display 403 includes a display section 49 and a touch panel section 51 disposed on the display section 49.

The touch panel section 51 is a device functioning as the position detecting section, including a touch surface 55 to be touched with fingertips, and configured to detect the positions on the touch surface 55 touched with the fingertips. The touch panel section 51 can concurrently detect three positions on the touch surface 55 which the fingertips of three fingers are touching. Furthermore, when the fingertips of two of three fingers are touching the touch surface 55 but the fingertip of the remaining finger is not touching the touch surface 55, the touch panel section 51 can concurrently detect two positions on the touch surface 55 which the fingertips of the two fingers are touching. There are various detection systems for the touch panel section 51, including a resistive film system and a capacitance system.

The display section 49 is configured to display a screen containing a 3D object 61 (see FIG. 4) located in an imaginary three-dimensional space.

The 3D object storage section 13 previously stores a 3D object 61 which can be displayed on the display section 49.

Figure 4:
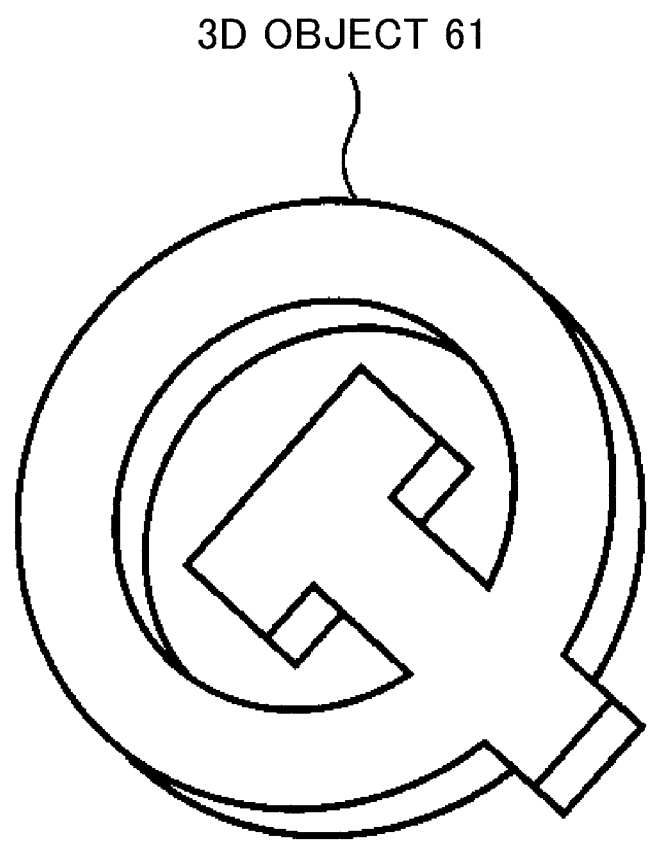
FIG. 4 is a view showing an example of a 3D object stored in a 3D object storage section.

FIG. 4 is a view showing an example of the 3D object 61 stored in the 3D object storage section 13.

As shown in FIG. 4, the 3D object 61 is used in order to explain the operation of rotating the 3D object 61 by a three-finger touch gesture using the display operating device 3. The 3D object 61 shown in FIG. 4 is not particularly associated with the operation of the image forming apparatus 1.

The display control section 11 is configured to read the 3D object 61 from the 3D object storage section 13 and allow the display section 49 to display the 3D object 61 located in the imaginary three-dimensional space.

The position decision section 15 is configured to decide the three positions detected by the touch panel section 51 as a first position, a second position, and a third position. Specifically, the position decision section 15 calculates the distances between each pair of the three positions and decides the two positions having the maximum distance as the first and second positions and the remaining one position as the third position.

The axis decision section 17 is configured to decide a first axis 63 (see FIG. 8) using the first and second positions which are two of the three positions detected by the touch panel section 51. The first axis 63 passes through a predetermined position of the 3D object 61 located in the imaginary three-dimensional space and is parallel, in the imaginary three-dimensional space, to a first imaginary line L1 passing through the first and second positions.

The movement determining section 19 is configured to determine whether or not the third position, which is the remaining one of the three positions detected by the touch panel section 51, is moving.

The first rotation processing section 25 is configured to, when with the 3D object 61 displayed on the display section 49 the touch panel section 51 detects the three positions and the movement determining section 19 determines that the third position is moving, perform processing to rotate the 3D object 61 displayed on the display section 49 by a first predetermined angle about the first axis 63 decided by the axis decision section 17 (first rotation processing).

The rotational direction decision section 21 is configured to decide, in the first rotation processing, the direction of rotation of the 3D object 61 displayed on the display section 49.

The rotational angle decision section 23 is configured to decide, in the first rotation processing, the angle of rotation of the 3D object 61 displayed on the display section 49.

As described previously, when the fingertips of two of three fingers are touching the touch surface 55 but the fingertip of the remaining finger is not touching the touch surface 55, the touch panel section 51 detects two positions on the touch surface 55 which the fingertips of the two fingers are touching. The rotation determining section 27 is configured to determine whether or not a second imaginary line L2 (see FIG. 14) passing through the above two positions is rotating.

Figure 14:
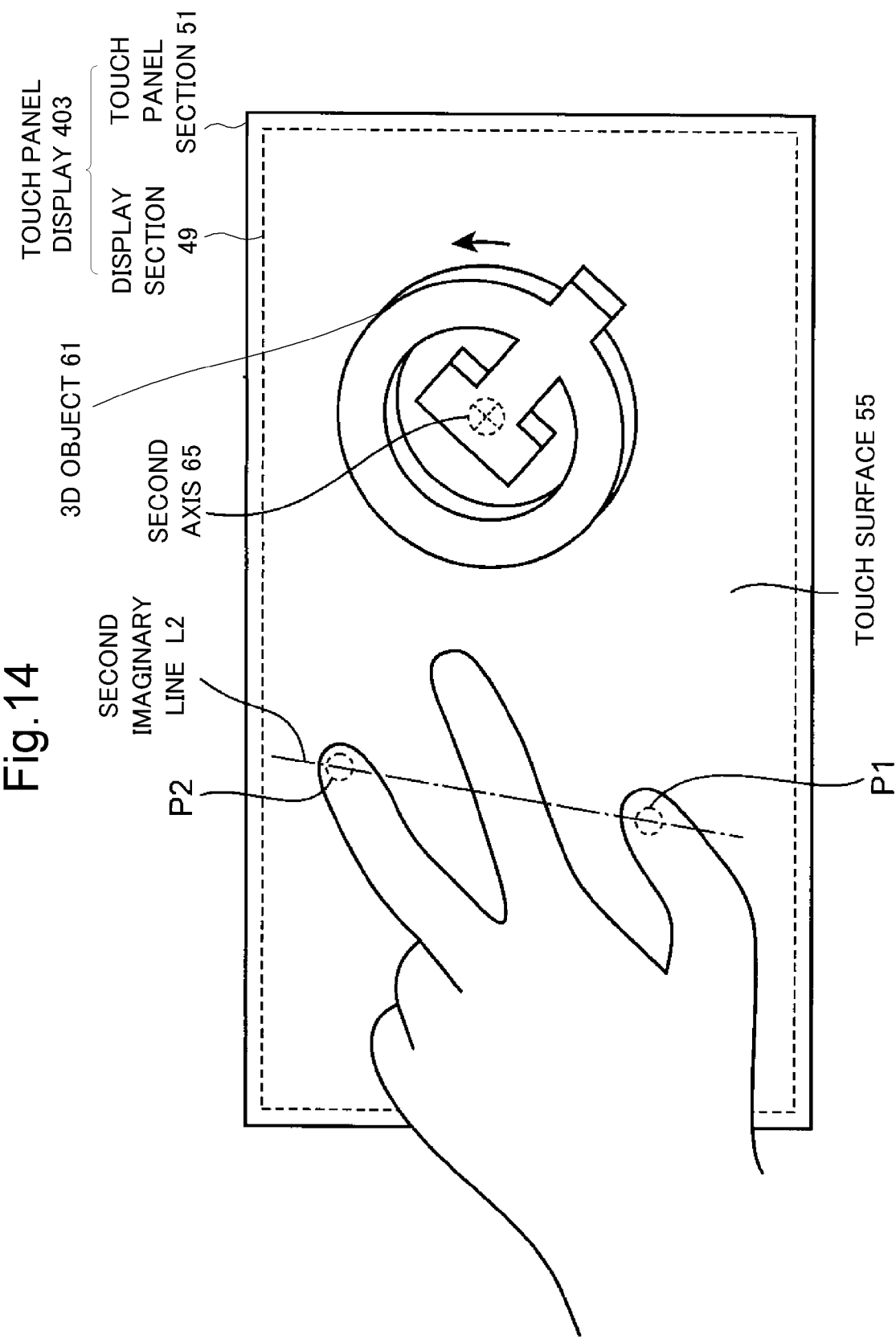
FIG. 14 is a ninth plan view of the touch panel display when the display operating device is operating.

The second rotation processing section 33 is configured to, when the rotation determining section 27 determines that the second imaginary line L2 is rotating, perform processing to rotate the 3D object 61 displayed on the display section 49 by a second predetermined angle about a second axis 65 shown in FIG. 14 (second rotation processing). The second axis 65 is an axis which is perpendicular to the screen containing the 3D object 61 displayed on the display section 49 and passes through a centroid of the 3D object 61.

The rotational direction decision section 29 is configured to decide, in the second rotation processing, the direction of rotation of the 3D object 61 displayed on the display section 49.

The rotational angle decision section 31 is configured to decide, in the second rotation processing, the angle of rotation of the 3D object 61 displayed on the display section 49.

Next, a description will be given of an operation of the display operating device 3 according to the embodiment of the present disclosure with reference to FIGS. 3 and 5 to 15.

Figure 5:
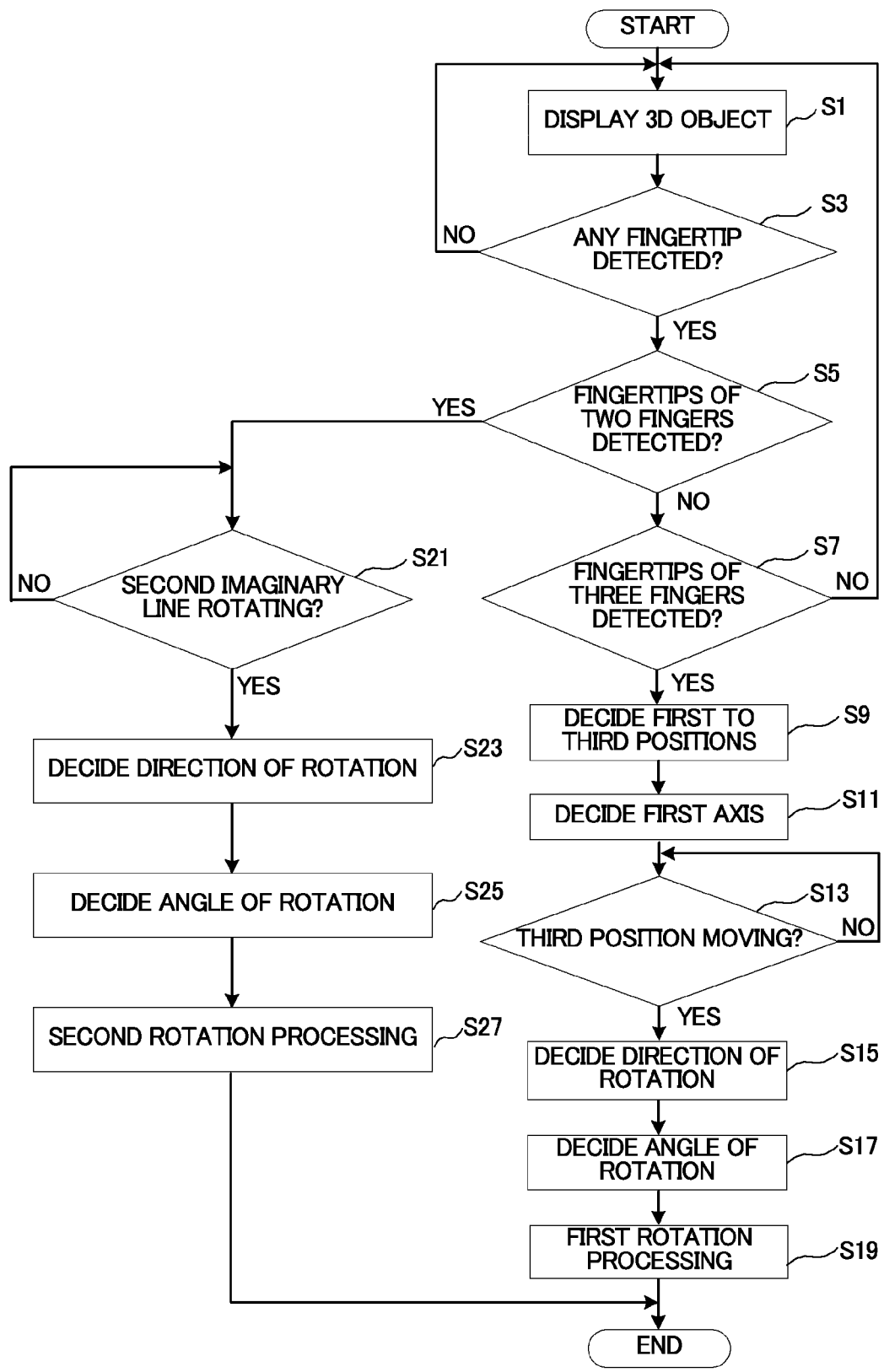
FIG. 5 is a flowchart for illustrating an operation of the display operating device according to the one embodiment of the present disclosure.

FIG. 5 is a flowchart for illustrating the operation of the display operating device 3.

FIGS. 6 to 15 are plan views of the touch panel display 403 when the display operating device 3 is operating.

Figure 6:
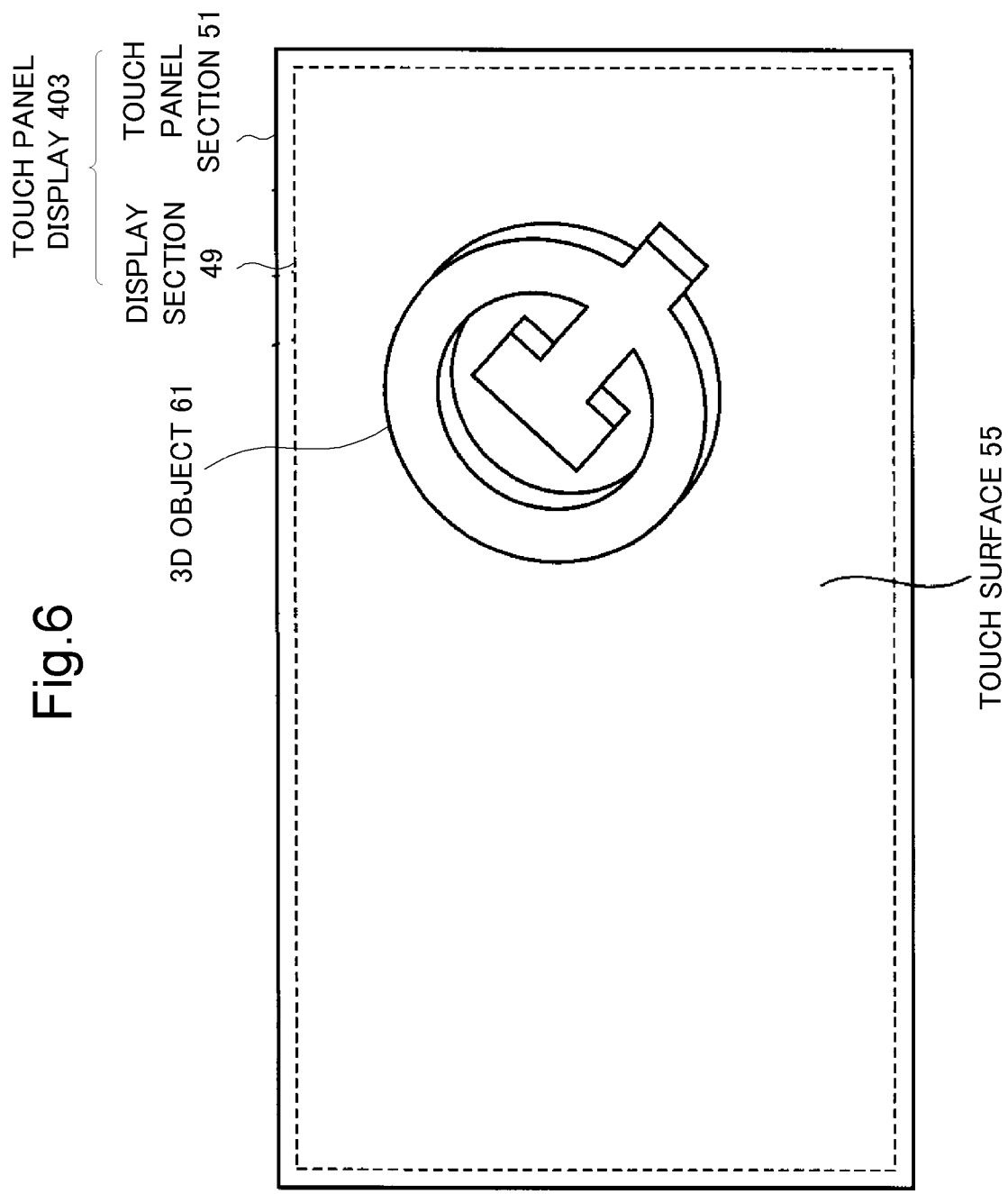
FIG. 6 is a first plan view of a touch panel display when the display operating device is operating.

The description begins with a state where a screen containing the 3D object 61 is displayed on the display section 49. Referring to FIG. 6, the display control section 11 reads the 3D object 61 (see FIG. 4) stored in the 3D object storage section 13 and allows the display section 49 to display a screen containing the 3D object 61 (step S1).

The touch panel section 51 determines whether or not any object (any fingertip in this case) is touching the touch surface 55 (step S3). If the touch panel section 51 does not determine that any fingertip is touching the touch surface 55 (No in step S3), the operation returns to step S1.

If the touch panel section 51 determines that any fingertip is touching the touch surface 55 (Yes in step S3), then the touch panel section 51 determines whether or not the number of fingertips touching the touch surface 55 is two (step S5). If the touch panel section 51 determines that the number of fingertips touching the touch surface 55 is two (Yes in step S5), the operation proceeds to step 21. The processing in step 21 will be described hereinafter.

If the touch panel section 51 does not determine that the number of fingertips touching the touch surface 55 is two (No in step S5), then the touch panel section 51 determines whether or not the number of fingertips touching the touch surface 55 is three (step S7). If the touch panel section 51 determines that the number of fingertips touching the touch surface 55 is not three (No in step S7), the operation returns to step S1.

Figure 7:
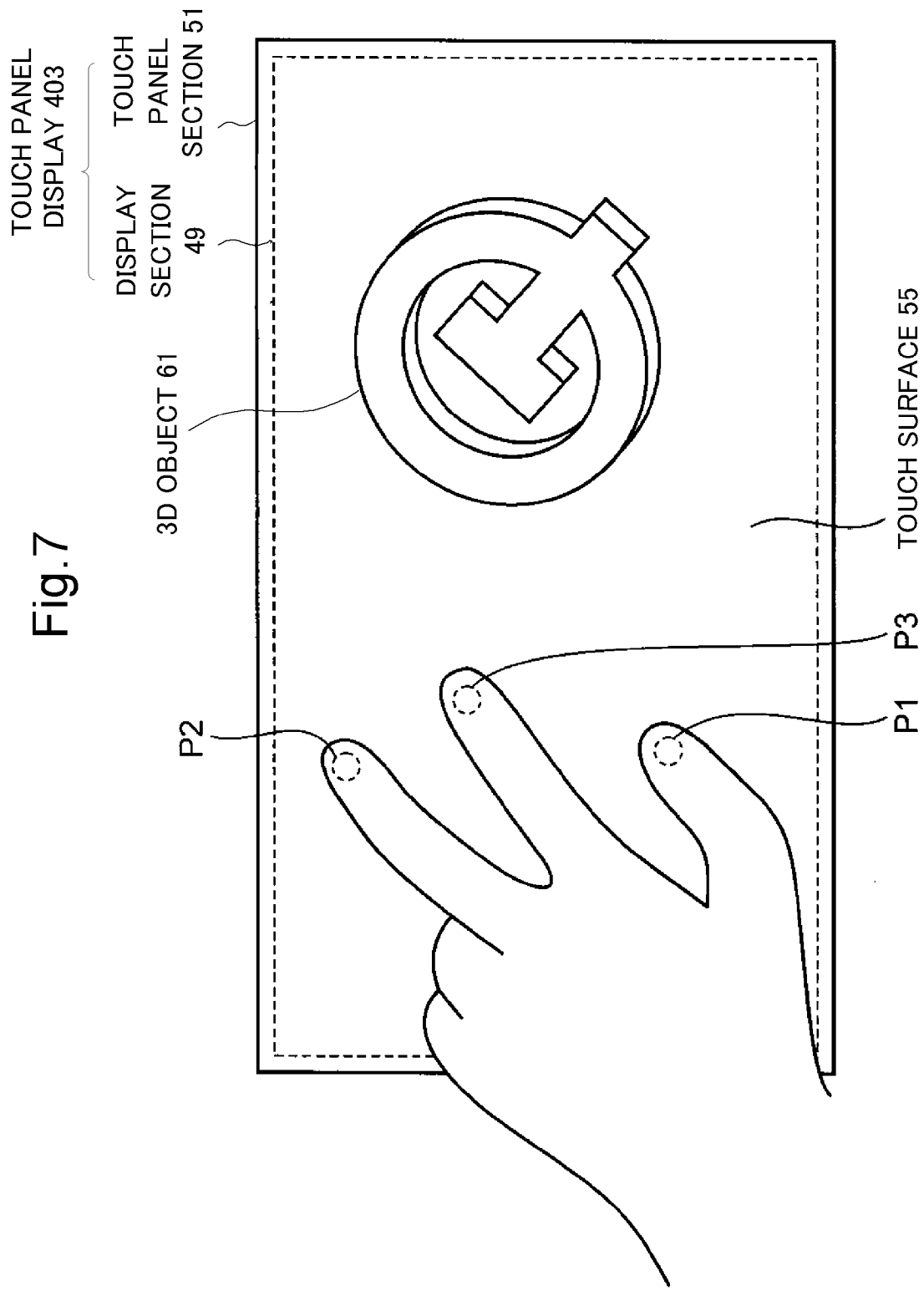
FIG. 7 is a second plan view of the touch panel display when the display operating device is operating.

Referring to FIG. 7, if the touch panel section 51 determines that the number of fingertips touching the touch surface 55 is three (Yes in step S7), i.e., when the touch panel section 51 concurrently detects three positions on the touch surface 55, the operation proceeds to step S9.

In the embodiment of the present disclosure, the three fingers are assumed as the thumb, the index finger, and the middle finger of the left hand. The position of the fingertip of the thumb on the touch surface 55 is referred to as a thumb position P1, the position of the fingertip of the middle finger thereon is referred to as a middle finger position P2, and the position of the fingertip of the index finger thereon is referred to as an index finger position P3.

The position decision section 15 decides which of the thumb position P1, the middle finger position P2, and the index finger position P3 corresponds to which of the first position, the second position, and the third position (step S9). More specifically, the position decision section 15 calculates the distance between the thumb position P1 and the middle finger position P2, the distance between the thumb position P1 and the index finger position P3, and the distance between the middle finger position P2 and the index finger position P3 and then decides a pair of finger positions having the maximum of the above distances as the first and second positions and the remaining one position as the third position.

In this case, the maximum distance is the distance between the thumb position P1 and the middle finger position P2. Therefore, one of the thumb position P1 and the middle finger position P2 is decided as the first position and the other is decided as the second position. Then, the index finger position P3 is decided as the third position.

Figure 8:
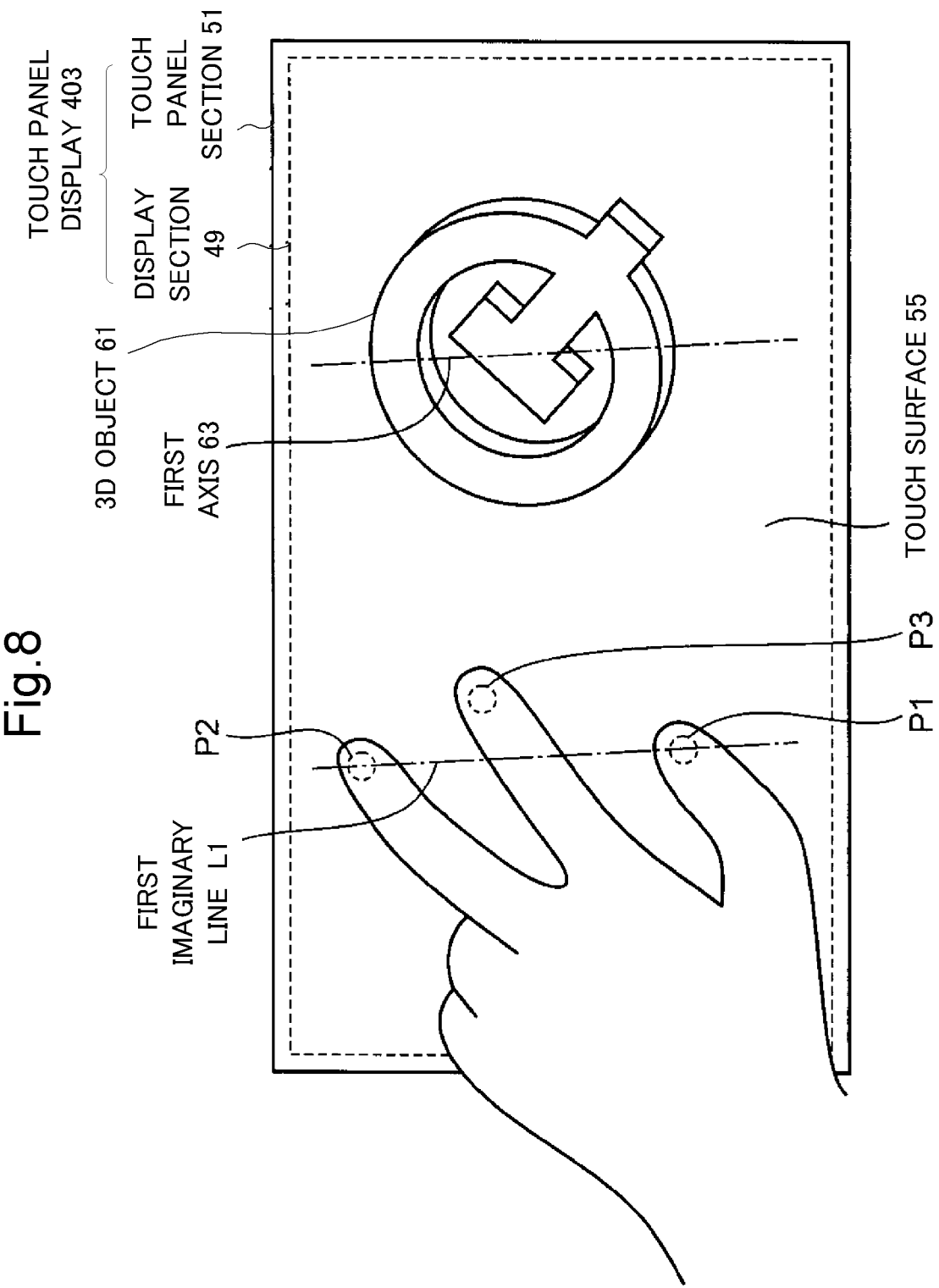
FIG. 8 is a third plan view of the touch panel display when the display operating device is operating.

Referring to FIG. 8, the axis decision section 17 decides the first axis 63 (step S11). The first axis 63 passes through the centroid of the 3D object 61 located in the imaginary three-dimensional space and is parallel, in the imaginary three-dimensional space, to a first imaginary line L1 passing through the thumb position P1 (one of the first and second positions) and the middle finger position P2 (the other of the first and second positions).

The movement determining section 19 determines, with the three positions detected by the touch panel section 51, whether or not the index finger position P3 (the third position) detected by the touch panel section 51 is moving (step S13). More specifically, the movement of the index finger position P3 toward the first imaginary line L1 is taken as a first movement M1 (see FIG. 9) and the movement of the index finger position P3 away from the first imaginary line L1 is taken as a second movement M2 (see FIG. 10).

Assumed here are rotations of the 3D object 61 about the first axis 63 caused by, among the three fingers (the thumb, index finger, and middle finger), the finger (index finger) moving to provide movement of the third position (the index finger position P3). The direction of rotation of the 3D object 61 about the first axis 63 caused by the first movement M1 is taken as a first direction D1 (see FIG. 9). The direction of rotation of the 3D object 61 about the first axis 63 caused by the second movement M2 is taken as a second direction D2 opposite to the first direction D1 (see FIG. 10).

If the movement determining section 19 does not determine that the index finger position P3 is moving (No in step S13), the operation repeats the processing in step S13.

If the movement determining section 19 determines that the index finger position P3 is moving (Yes in step S13), the rotational direction decision section 21 determines whether the movement is the first movement M1 or the second movement M2.

If the rotational direction decision section 21 determines that the movement is the first movement M1, then it decides the direction of rotation of the 3D object 61 as the first direction D1, or if the rotational direction decision section 21 determines that the movement is the second movement M2, then it decides the direction of rotation of the 3D object 61 as the second direction D2 (step S15).

The rotational angle decision section 23 decides the angle of rotation of the 3D object 61 (step S17). More specifically, the rotational angle decision section 23 previously stores a table in which various amounts of movement of the third position (index finger position P3) are associated with respective angles of rotation of the 3D object 61. In step S17, the rotational angle decision section 23 calculates the amount of movement of the third position (index finger position P3), and decides the angle of rotation associated with the amount of movement obtained by the calculation as the angle of rotation of the 3D object 61. As the amount of movement of the index finger position P3 increases, the angle of rotation of the 3D object 61 is increased. As the amount of movement of the index finger position P3 decreases, the angle of rotation of the 3D object 61 is decreased. In the above manner, the rotational angle decision section 23 calculates the amount of movement of the index finger position P3 to decide the angle of rotation of the 3D object 61.

Figure 11:
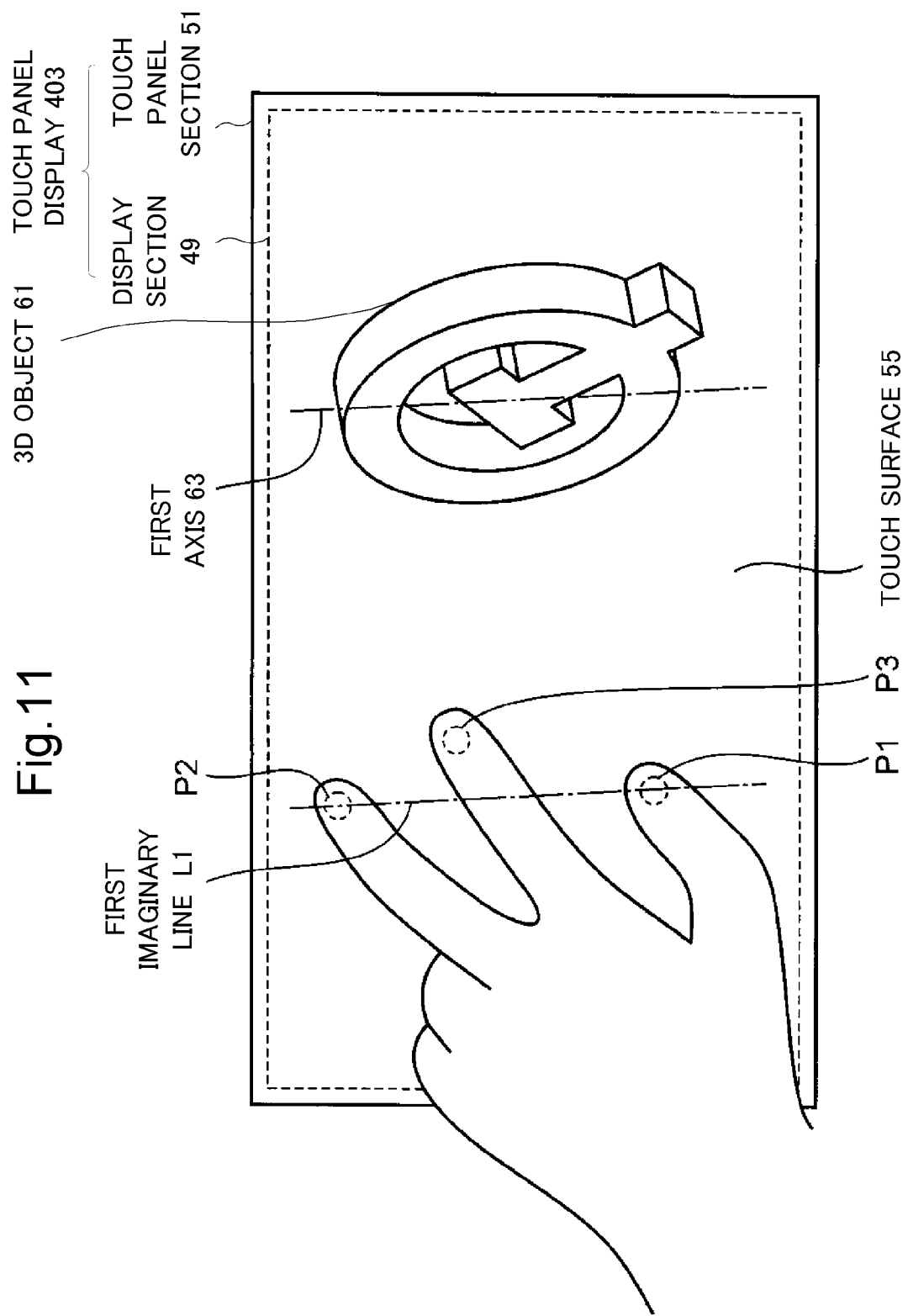
FIG. 11 is a sixth plan view of the touch panel display when the display operating device is operating.

Referring to FIG. 11, the first rotation processing section 25 performs processing to rotate the 3D object 61 displayed on the display section 49 by a first predetermined angle (step S19). More specifically, processing is performed to rotate the 3D object 61 about the first axis 63 decided in step S11, in the direction of rotation decided in step S15, and at the angle of rotation decided in step S17.

Figure 12:
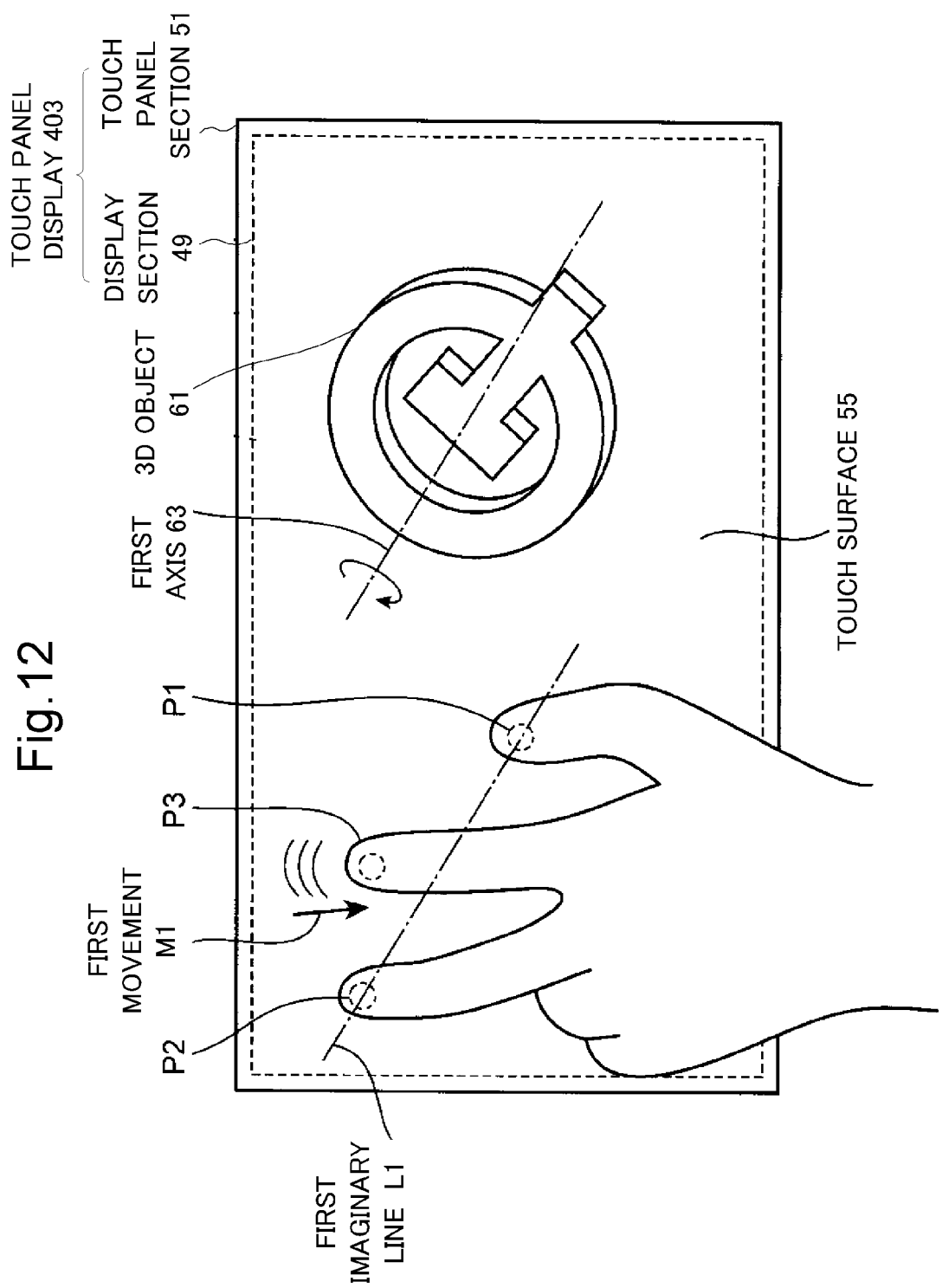
FIG. 12 is a seventh plan view of the touch panel display when the display operating device is operating.
Figure 13:
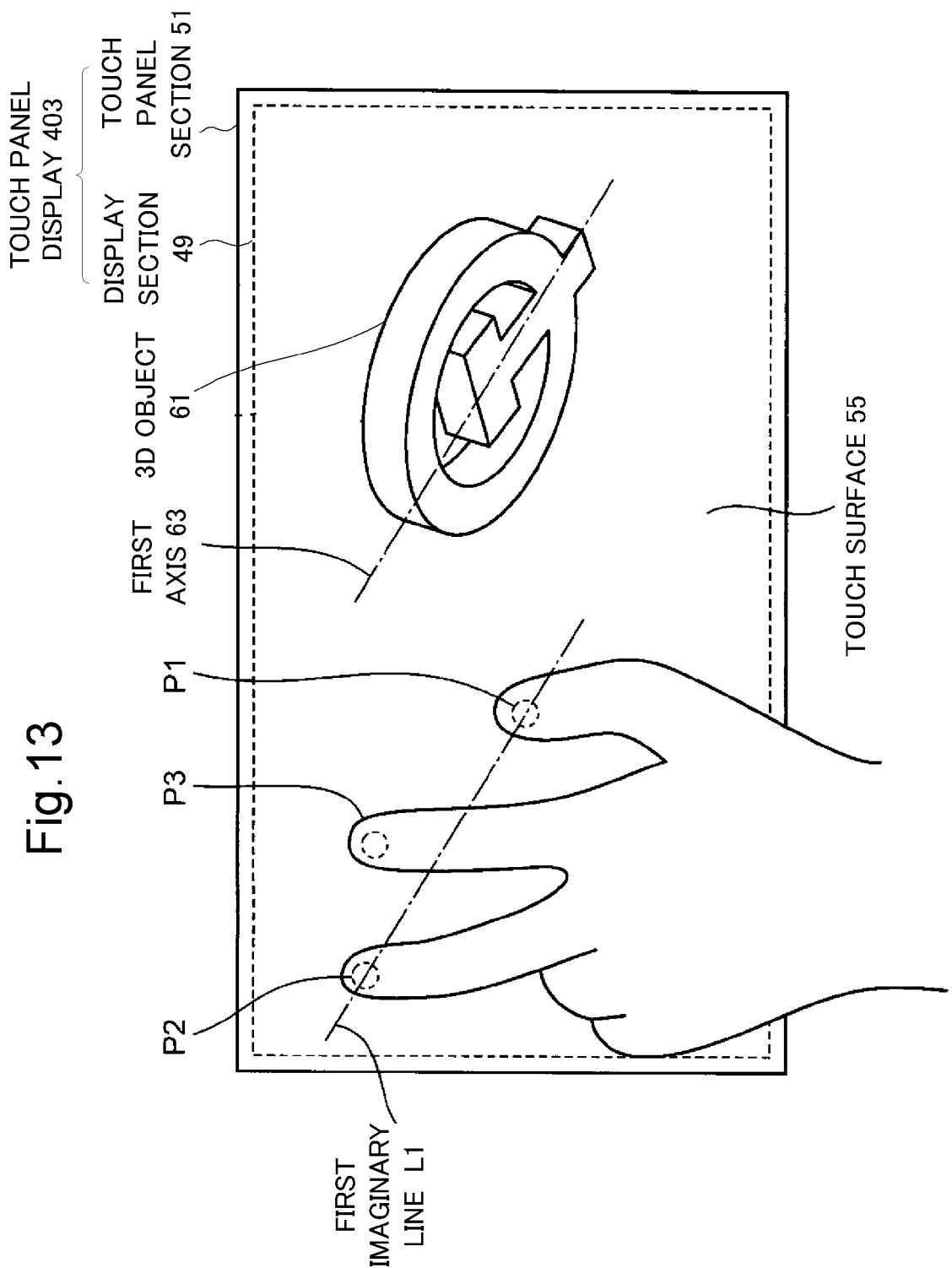
FIG. 13 is an eighth plan view of the touch panel display when the display operating device is operating.

The direction of the first axis 63 can be arbitrarily set by the positions of two fingertips (the thumb position P1 and the middle finger position P2 in this case). FIG. 12 shows an example where the first imaginary line L1 is brought closer to the horizontal direction than that shown in FIG. 8. In this example, the 3D object 61 can be rotated about the first axis 63 parallel to the first imaginary line L1 shown in FIG. 12 and passing through the centroid of the 3D object 61 (see FIG. 13).

On the other hand, if the touch panel section 51 determines that the number of fingertips touching the touch surface 55 is two (Yes in step S5), or when the touch panel section 51 detects two positions on the touch surface 55 being touched with two fingertips as shown in FIG. 14, the operation proceeds to step 21. Here, a description will be given of an example where the positions of the two fingertips are the thumb position P1 and the middle finger position P2.

The rotation determining section 27 determines whether or not a second imaginary line L2 passing through the thumb position P1 and the middle finger position P2 is rotating (step S21). If the rotation determining section 27 does not determine that the second imaginary line L2 is rotating (No in step S21), the processing in step S21 is repeated.

If the rotation determining section 27 determines that the second imaginary line L2 is rotating (Yes in step S21), then the rotation determining section 27 determines whether the direction of the rotation is clockwise or counterclockwise.

If the direction of rotation of the second imaginary line L2 is determined to be clockwise, the rotational direction decision section 29 decides the direction of rotation of the 3D object 61 as the clockwise direction, or if the direction of rotation of the second imaginary line L2 is determined to be counterclockwise, the rotational direction decision section 29 decides the direction of rotation of the 3D object 61 as the counterclockwise direction (step S23).

The rotational angle decision section 31 decides the angle of rotation of the 3D object 61 (step S25). More specifically, the rotational angle decision section 31 previously stores a table in which various angles of rotation of the second imaginary line L2 are associated with respective angles of rotation of the 3D object 61. In the table, as the angle of rotation of the second imaginary line L2 increases, the angle of rotation of the 3D object 61 is increased. In step S25, the rotational angle decision section 31 calculates the angle of rotation of the second imaginary line L2 and decides the angle of rotation of the 3D object 61 from the calculation result.

Figure 15:
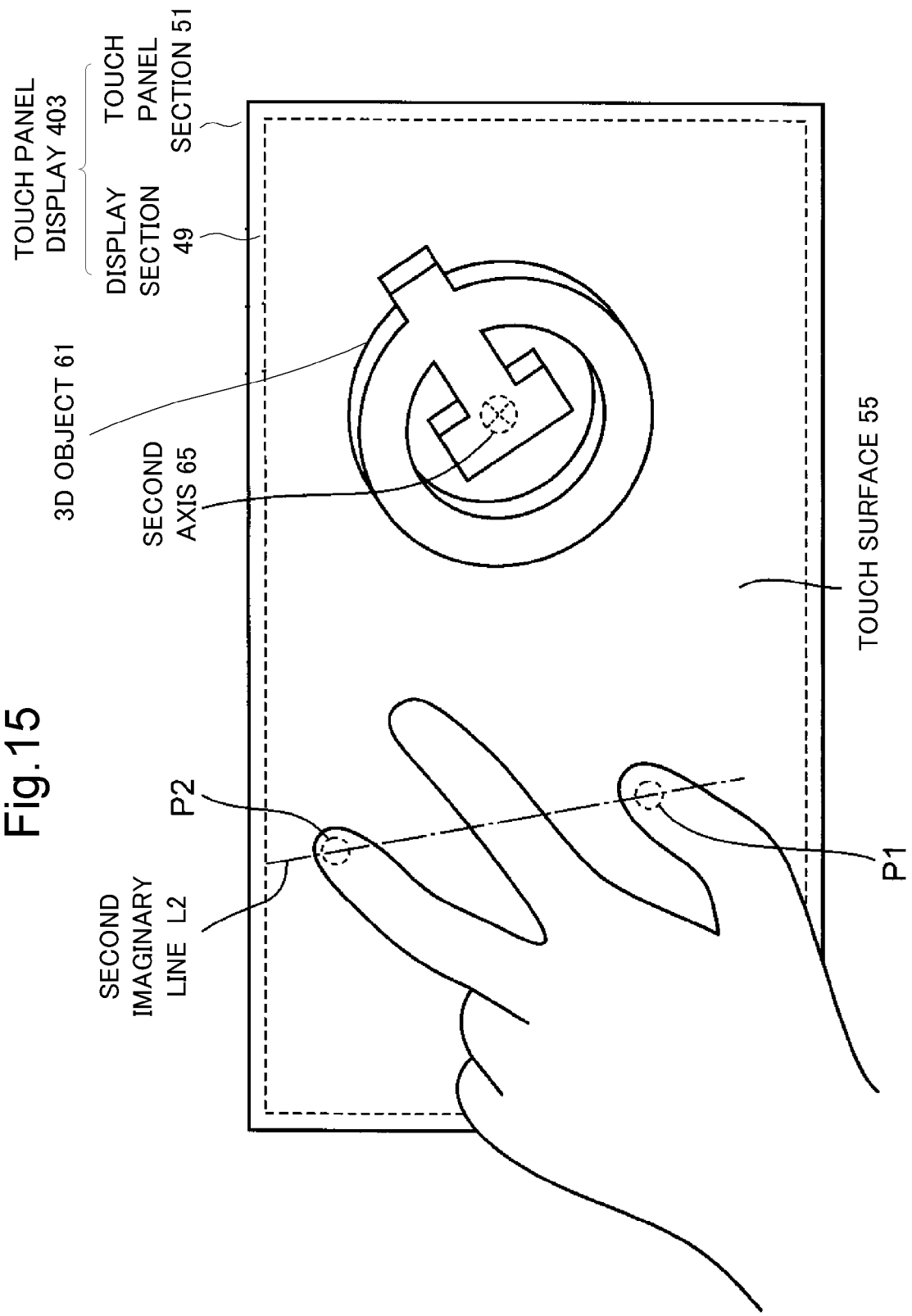
FIG. 15 is a tenth plan view of the touch panel display when the display operating device is operating.

Referring to FIG. 15, the second rotation processing section 33 performs processing to rotate the 3D object 61 displayed on the display section 49 by a second predetermined angle about the second axis 65 (step S27). More specifically, the second axis 65 is an axis perpendicular to the screen containing the 3D object 61 and passes through the centroid of the 3D object 61. In step S27, processing is performed to rotate the 3D object 61 about the second axis 65, in the direction of rotation decided in step S23, and at the angle of rotation decided in step S25.

Figure 9:
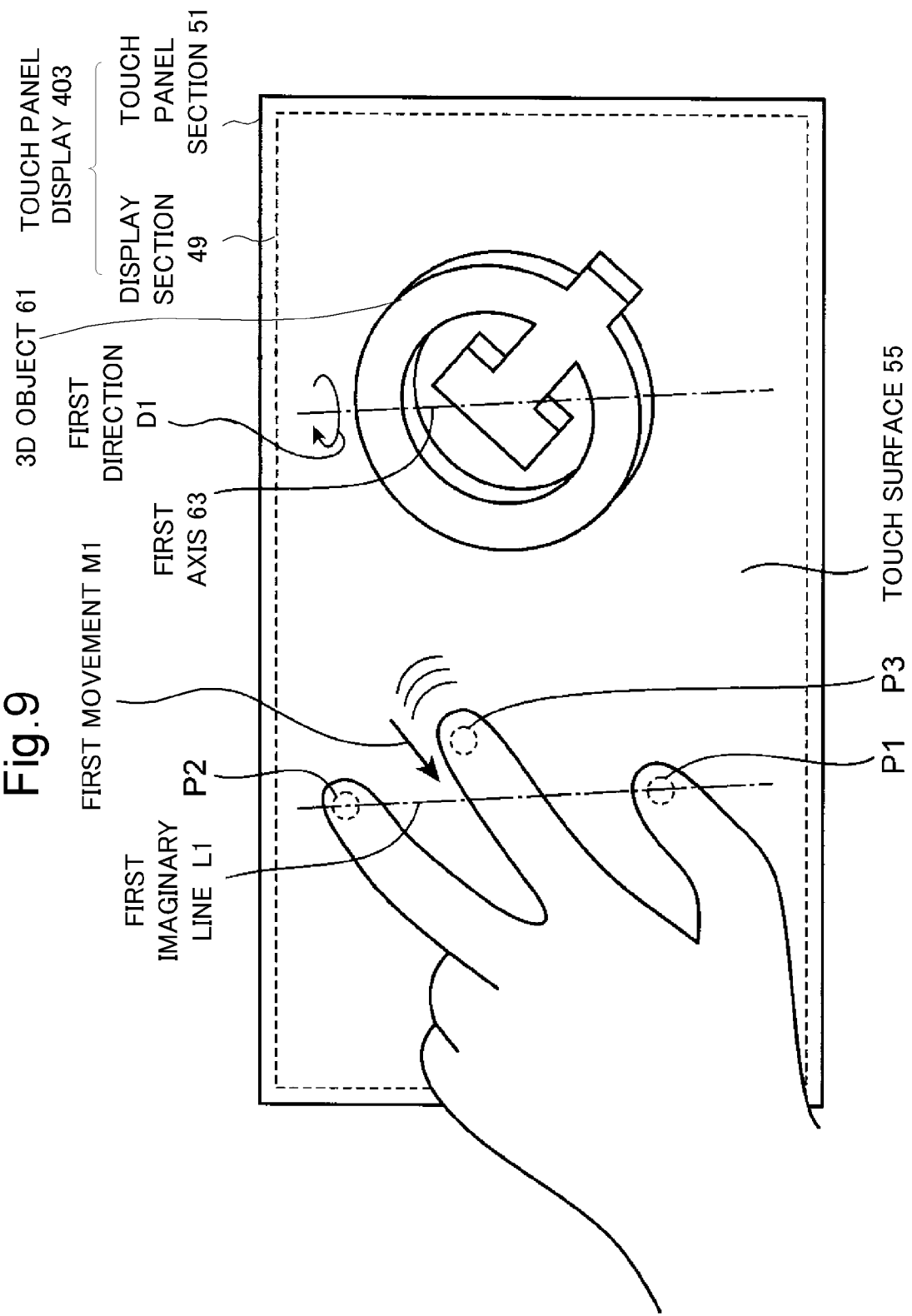
FIG. 9 is a fourth plan view of the touch panel display when the display operating device is operating.
Figure 10:
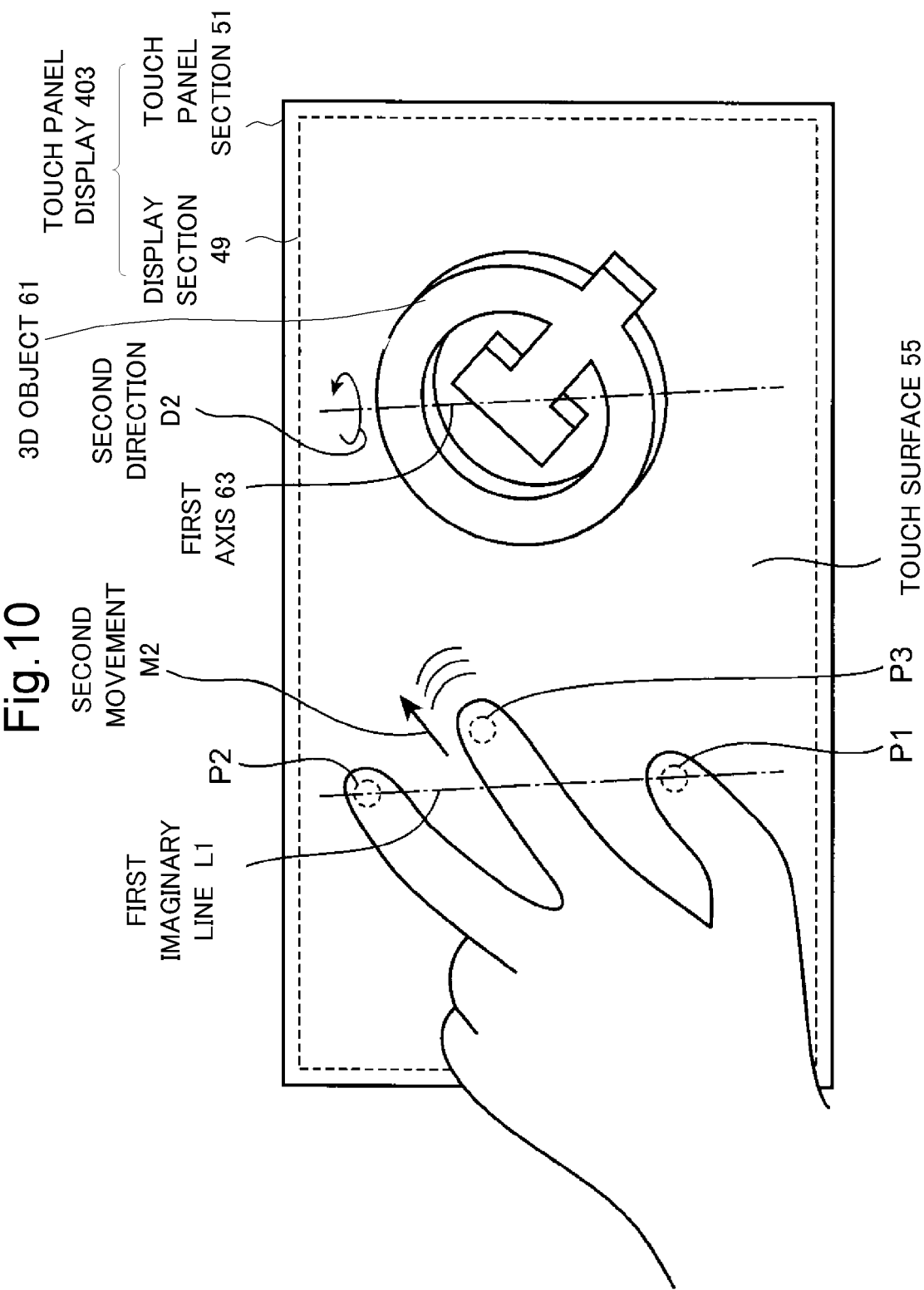
FIG. 10 is a fifth plan view of the touch panel display when the display operating device is operating.

Major effects of the embodiment of the present disclosure will be described below. In the embodiment of the present disclosure, as shown in FIG. 7, three positions on the touch surface 55 touched with three fingertips (the thumb position P1, the middle finger position P2, and the index finger position P3) are detected. As shown in FIG. 8, the thumb position P1 (one of the first and second positions) and the middle finger position P2 (the other of the first and second positions) are used to decide the first axis 63 which is parallel in the imaginary three-dimensional space to the first imaginary line L1 passing through the thumb position P1 and the middle finger position P2 and passes through the centroid of the 3D object 61 located in the imaginary three-dimensional space. As shown in FIGS. 9 and 10, it is determined whether or not the third position (the index finger position P3) is moving. As shown in FIG. 11, when with the 3D object 61 displayed on the display section 49 the aforementioned three positions are detected and the third position is determined to be moving, processing is performed to rotate the 3D object 61 displayed on the display section 49 by the first predetermined angle about the first axis 63.

As can be seen from the above, in the embodiment of the present disclosure, a three-finger touch gesture is used to set the first axis 63 serving as the central axis for rotating the 3D object 61 and give an instruction to rotate the 3D object 61. Therefore, the operation of rotating the 3D object 61 in any direction can be achieved without conflicting with other operations using one-finger touch gestures and two-finger touch gestures.

Furthermore, in the embodiment of the present disclosure, since the operation of rotating the 3D object 61 in any direction can be achieved by a three-finger touch gesture, the 3D object 61 can be operated to rotate in any direction with one hand.

Moreover, in the embodiment of the present disclosure, no GUI is used for the operation of rotating the 3D object 61 in any direction. Therefore, the display area for the 3D object 61 in the display section 49 can be increased.

As shown in FIGS. 9 and 10, in the embodiment of the present disclosure, when assuming rotations of the 3D object 61 about the first axis 63 caused by, among three fingers, the finger moving to provide movement of the third position (the index finger position P3), the direction of rotation of the 3D object 61 about the first axis 63 caused by the first movement M1 is taken as a first direction D1 and the direction of rotation of the 3D object 61 about the first axis 63 caused by the second movement M2 is taken as a second direction D2 opposite to the first direction D1. Thus, in the embodiment of the present disclosure, the direction of rotation of the 3D object 61 can correspond to the direction of rotation of the scroll wheel of a mouse during rotation of the scroll wheel with a fingertip. Therefore, the operation of rotating the 3D object 61 can be performed intuitively.

However, in both the first movement M1 and the second movement M2, the direction of rotation of the 3D object 61 may be the first direction D1. Contrariwise, in both the first movement M1 and the second movement M2, the direction of rotation of the 3D object 61 may be the second direction D2. Alternatively, the case may also arise where the direction of rotation of the 3D object 61 in the first movement M1 is the second direction D2 and the direction of rotation of the 3D object 61 in the second movement M2 is the first direction D1.

As shown in FIGS. 14 and 15, in the embodiment of the present disclosure, when the fingertips of two of three fingers are touching the touch surface 55 but the fingertip of the remaining one is not touching the touch surface 55, the touch panel section 51 detects two positions on the touch surface 55 (the thumb position P1 and the middle finger position P2) which the fingertips of the two fingers are touching. Then, when the second imaginary line L2 passing through the two positions is determined to be rotating, processing is performed to rotate the 3D object 61 displayed on the display section 49 by the second predetermined angle about the second axis 65 which is perpendicular to the screen containing the 3D object 61 displayed on the display section 49 and passes through the centroid of the 3D object 61.

Therefore, in the embodiment of the present disclosure, the 3D object 61 can be rotated about the second axis 65 without conflict with the operation of rotating the 3D object 61 about the first axis 63.

In the embodiment of the present disclosure, the operation of rotating the 3D object 61 about the second axis 65 using, among the fingertips of three fingers, those of the outside two fingers (for example, the thumb and middle finger) and the operation of rotating the 3D object 61 about the first axis 63 additionally using the fingertip of the intermediate finger (index finger) can be performed seamlessly.

There are some possible manners for the position decision section 15 to decide three positions detected by the touch panel section 51 as the first, second, and third positions. A three-finger touch gesture can be performed by designating the direction of the first axis 63 by touching with the fingertips of outside two of three fingers and then moving the fingertip of the remaining one finger on the touch surface. In this case, the distance between the positions of the fingertips of the outside two fingers is the maximum distance. Therefore, in this embodiment, the distances between each pair of the three positions detected by the touch panel section 51 are calculated, the two positions having the maximum distance are decided as the first and second positions, and the remaining one position is decided as the third position.

Another possible manner for the position decision section 15 is as follows. When with three positions concurrently detected by the touch panel section 51 any one of the three positions is detected to be moving, the position decision section 15 decides the position detected to be moving as the third position and the remaining two positions as the first and second positions. In this case, there is no need to calculate the distances between each pair of the three positions detected by the touch panel section 51.

In the embodiment of the present disclosure, the rotational angle decision section 23 previously stores a table in which various amounts of movement of the third position (index finger position P3) are associated with respective angles of rotation of the 3D object 61, calculates the amount of movement of the third position (index finger position P3), and decides the angle of rotation associated with the amount of movement obtained by the calculation as the angle of rotation of the 3D object 61. Then, the first rotation processing section 25 performs processing to rotate the 3D object 61 by the angle of rotation decided by the rotational angle decision section 23.

Thus, in the embodiment of the present disclosure, the angle of rotation of the 3D object 61 can correspond to the amount of movement of the third position (index finger position P3). Therefore, the operation of rotating the 3D object 61 can be performed intuitively.

In the embodiment of the present disclosure, the touch panel section 51 forming part of the touch panel display 403 serves as the position detecting section. However, the position detecting section is not limited to this. For example, a touch pad may be used as the position detecting section.

The above embodiment of the present disclosure has described taking as an example the rotation of the 3D object 61 shown in FIG. 4. In the case of the image forming apparatus 1, a specific example of the 3D object 61 is a three-dimensional image of the image forming apparatus 1. If the image forming apparatus 1 jams, the display control section 11 allows the touch panel display 403 to display a guidance screen for the operation of eliminating the paper jam. This screen contains a three-dimensional image of the image forming apparatus 1. In the embodiment of the present disclosure, the user can allow the touch panel display 403 to display the three-dimensional image of the image forming apparatus 1 in a manner to rotate it in any direction. Furthermore, the user can readily identify the cover necessary to open from among a plurality of covers of the image forming apparatus 1 by rotating the three-dimensional image of the image forming apparatus 1 in any direction, while reading the procedure for eliminating the paper jam shown on the guidance screen.

In the embodiment of the present disclosure, three fingers touching the touch surface have been assumed as the thumb, the index finger, and the middle finger of the left hand. However, the three fingers are optional and may be, for example, the thumb, the index finger, and the ring finger. Alternatively, the three fingers may be any combination of three fingers of the right hand.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A display operating device comprising:
a position detecting section including a touch surface and configured to detect three positions on the touch surface which fingertips of three fingers are touching;
an axis decision section configured to, using first and second positions, which are two of the three positions detected by the position detecting section, decide a first axis which is parallel in an imaginary three-dimensional space to a first imaginary line passing through the first and second positions and passes through a predetermined position of a 3D object located in the imaginary three-dimensional space;
a movement determining section configured to determine whether or not a third position, which is a remaining one of the three positions, is moving;
a display section; and
a first rotation processing section configured to, when with the 3D object displayed on the display section the position detecting section detects the three positions and the movement determining section determines that the third position is moving, perform processing to rotate the 3D object displayed on the display section about the first axis decided by the axis decision section,
wherein where movement of the third position toward the first imaginary line is taken as a first movement and movement of the third position away from the first imaginary line is taken as a second movement, and
where on an assumption of rotations of the 3D object about the first axis caused by one of the three fingers moving to provide the movement of the third position a direction of rotation of the 3D object about the first axis caused by the first movement is taken as a first direction and a direction of rotation of the 3D object about the first axis caused by the second movement is taken as a second direction,
the display operating device further comprises a rotational direction decision section configured to determine whether the movement of the third position is the first movement or the second movement, decide the direction of rotation of the 3D object as the first direction when determining the movement of the third position as the first movement, and decide the direction of rotation of the 3D object as the second direction when determining the movement of the third position as the second movement, and
the first rotation processing section is configured to perform processing to rotate the 3D object displayed on the display section in the direction of rotation decided by the rotational direction decision section.

2. The display operating device according to claim 1, further comprising a position decision section configured to, when with the three positions detected by the position detecting section any one of the three positions is detected to be moving, decide the position detected to be moving as the third position and the remaining two positions as the first and second positions.

3. An image forming apparatus comprising:
an image forming section; and
the display operating device according to claim 1.

4. A display operating device comprising:
a position detecting section including a touch surface and configured to detect three positions on the touch surface which fingertips of three fingers are touching;
an axis decision section configured to, using first and second positions, which are two of the three positions detected by the position detecting section, decide a first axis which is parallel in an imaginary three-dimensional space to a first imaginary line passing through the first and second positions and passes through a predetermined position of a 3D object located in the imaginary three-dimensional space;
a movement determining section configured to determine whether or not a third position, which is a remaining one of the three positions, is moving;
a display section; and
a first rotation processing section configured to, when with the 3D object displayed on the display section the position detecting section detects the three positions and the movement determining section determines that the third position is moving, perform processing to rotate the 3D object displayed on the display section about the first axis decided by the axis decision section,
wherein when the fingertips of two of the three fingers are touching the touch surface but the fingertip of the remaining one finger is not touching the touch surface, the position detecting section detects two positions on the touch surface which the fingertips of the two fingers are touching, and wherein the display operating device further comprises:

a rotation determining section configured to determine whether or not a second imaginary line passing through the two positions is rotating; and a second rotation processing section configured to, when the rotation determining section determines that the second imaginary line is rotating, perform processing to rotate the 3D object displayed on the display section about a second axis which is perpendicular to a screen containing the 3D object displayed on the display section and passes through the predetermined position of the 3D object.

5. A display operating device comprising:

a position detecting section including a touch surface and configured to detect three positions on the touch surface which fingertips of three fingers are touching;

an axis decision section configured to, using first and second positions, which are two of the three positions detected by the position detecting section, decide a first axis which is parallel in an imaginary three-dimensional space to a first imaginary line passing through the first and second positions and passes through a predetermined position of a 3D object located in the imaginary three-dimensional space;

a movement determining section configured to determine whether or not a third position, which is a remaining one of the three positions, is moving;

a display section, a first rotation processing section configured to when with the 3D object displayed on the display section the position detecting section detects the three positions and the movement determining section determines that the third position is moving, perform processing to rotate the 3D object displayed on the display section about the first axis decided by the axis decision section; and a position decision section configured to calculate distances between each pair of the three positions and decide the two positions having the maximum distance as the first and second positions and the remaining one position as the third position.

6. A display operating device comprising:

a position detecting section including a touch surface and configured to detect three positions on the touch surface which fingertips of three fingers are touching;

an axis decision section configured to, using first and second positions, which are two of the three positions detected by the position detecting section, decide a first axis which is parallel in an imaginary three-dimensional space to a first imaginary line passing through the first and second positions and passes through a predetermined position of a 3D object located in the imaginary three-dimensional space;

a movement determining section configured to determine whether or not a third position, which is a remaining one of the three positions, is moving;

a display section, a first rotation processing section configured to when with the 3D object displayed on the display section the position detecting section detects the three positions and the movement determining section determines that the third position is moving, perform processing to rotate the 3D object displayed on the display section about the first axis decided by the axis decision section; and a rotational angle decision section previously storing a table in which various amounts of movement of the third position are associated with respective angles of rotation of the 3D object, the rotational angle decision section being configured to calculate the amount of movement of the third position and decide the angle of rotation associated with the amount of movement obtained by the calculation as the angle of rotation of the 3D object, wherein the first rotation processing section is configured to perform processing to rotate the 3D object by the angle of rotation decided by the rotational angle decision section.

* * * * *